(12) United States Patent
Yang et al.

(10) Patent No.: US 9,384,761 B1
(45) Date of Patent: Jul. 5, 2016

(54) SYSTEMS AND METHODS FOR FLEXIBLE VARIABLE CODE RATE SUPPORT

(71) Applicant: Avago Technologies General IP (Singapore) Pte. Ltd., Singapore (SG)

(72) Inventors: Shaohua Yang, San Jose, CA (US); Yang Han, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/683,090

(22) Filed: Apr. 9, 2015

(51) Int. Cl.
*G11B 5/09* (2006.01)
*G11B 5/02* (2006.01)

(52) U.S. Cl.
CPC ........................ *G11B 5/09* (2013.01)

(58) Field of Classification Search
CPC ............... G11B 20/10009; G11B 5/09; G11B 2220/90; G11B 2220/20; G11B 5/00; G11B 5/02; G11B 20/1403; G11B 5/59655
USPC ................... 360/18, 22, 24, 31, 29, 39, 51, 55
See application file for complete search history.

(56) References Cited

U.S. PATENT DOCUMENTS

| | | | |
|---|---|---|---|
| 5,222,069 A | 6/1993 | Chevalley | |
| 5,731,922 A | 3/1998 | Yamasaki | |
| 5,938,790 A | 8/1999 | Marrow | |
| 6,029,264 A | 2/2000 | Kobayashi | |
| 6,272,659 B1 | 8/2001 | Zook | |
| 6,438,724 B1 | 8/2002 | Cox | |
| 6,446,234 B1 | 9/2002 | Cox | |
| 6,493,846 B1 | 12/2002 | Kondo | |
| 6,694,477 B1 | 2/2004 | Lee | |
| 6,810,094 B1 | 10/2004 | Lu | |
| 6,847,601 B2 | 1/2005 | Kanai | |
| 7,178,086 B2 | 2/2007 | Hassner | |
| 7,395,491 B2 | 7/2008 | Chen | |
| 7,685,497 B2 | 3/2010 | Kons | |
| 7,830,633 B2 * | 11/2010 | Miura | G11B 5/09 360/46 |
| 8,230,292 B2 | 7/2012 | Fujiwara | |
| 8,514,507 B2 | 8/2013 | Isono et al. | |
| 8,527,831 B2 | 9/2013 | Li et al. | |
| 8,726,122 B2 | 5/2014 | Pisek | |
| 2005/0166132 A1 | 7/2005 | Shen et al. | |
| 2007/0201632 A1 | 8/2007 | Ionescu | |
| 2010/0042890 A1 | 2/2010 | Gunnam et al. | |
| 2010/0287436 A1 | 11/2010 | Lastras-Montano | |
| 2011/0109773 A1 | 5/2011 | Dekel | |
| 2011/0161774 A1 | 6/2011 | Shin et al. | |
| 2011/0164745 A1 | 7/2011 | Marzetta et al. | |
| 2012/0005551 A1 | 1/2012 | Gunnam | |
| 2012/0288003 A1 | 11/2012 | Do et al. | |
| 2013/0007570 A1 | 1/2013 | Seago | |
| 2013/0024163 A1 | 1/2013 | Xia | |

(Continued)

FOREIGN PATENT DOCUMENTS

JP 06046406 2/1994

OTHER PUBLICATIONS

U.S. Appl. No. 14/322,376, filed Jul. 2, 2014, Alhussien, Abdel Hakim S.

(Continued)

*Primary Examiner* — Nabil Hindi (57) ABSTRACT

Embodiments are related to systems and methods for data processing, and more particularly to systems and methods for data encoding and decoding.

20 Claims, 9 Drawing Sheets

(56) References Cited

U.S. PATENT DOCUMENTS

2013/0086446 A1    4/2013    Yeung et al.
2014/0085114 A1    3/2014    Cideciyan et al.

OTHER PUBLICATIONS

U.S. Appl. No. 14/611,949, filed Feb. 2, 2015, Han, Yang.
U.S. Appl. No. 14/177,496, filed Feb. 11, 2014, Yang.
U.S. Appl. No. 14/082,261, filed Nov. 18, 2013, Yang.
U.S. Appl. No. 14/025,356, filed Sep. 12, 2013, Aravind.
U.S. Appl. No. 14/025,468, filed Sep. 12, 2013, Yang.
U.S. Appl. No. 13/654,417, filed Oct. 18, 2012, Zhang.
U.S. Appl. No. 13/766,857, filed Feb. 14, 2013, Yang.
U.S. Appl. No. 13/707,898, filed Dec. 7, 2012, Karabed.
U.S. Appl. No. 13/426,722, filed Mar. 22, 2012, Zhang.
U.S. Appl. No. 13/452,733, filed Apr. 20, 2012, Yang.
U.S. Appl. No. 13/450,289, filed Apr. 18, 2012, Yang.
U.S. Appl. No. 13/284,754, filed Oct. 28, 2011, Zhang.
U.S. Appl. No. 13/363,751, filed Feb. 1, 2012, Chen.
U.S. Appl. No. 13/426,714, filed Mar. 22, 2012, Yang.
U.S. Appl. No. 13/422,986, filed Mar. 16, 2012, Zhang.
Kang et al., "A Two-Stage Iterative Decoding of LDPC Codes for Lowering Error Floors", IEEE GLOBECOM Proceedings, 1088-1091 (2008).
Lin et al "An efficient VLSI Architecture for non binary LDPC decoders"—IEEE Transaction on Circuits and Systems II vol. 57, Issue 1 (Jan. 2010) pp. 51-55.
Perisa et al "Frequency Offset Estimation Based on Phase Offsets Between Sample Correlations" Dept. of Info. Tech. University of Ulm 2005.

* cited by examiner

SYSTEMS AND METHODS FOR FLEXIBLE VARIABLE CODE RATE SUPPORT

FIELD OF THE INVENTION

Embodiments are related to systems and methods for data processing, and more particularly to systems and methods for data encoding and decoding.

BACKGROUND

Various storage access systems have been developed that support multiple code rates. Such multiple code rates include wiring variable check units to check processing units. Where non-layered decoding has been used, the aforementioned wiring required to support variable code rates is often impractical. This is especially true where a large parity check matrix is utilized. In some cases, non-layered decoding is desirable, but not practical.

Hence, for at least the aforementioned reasons, there exists a need in the art for advanced systems and methods for data encoding and decoding.

SUMMARY

Embodiments are related to systems and methods for data processing, and more particularly to systems and methods for data encoding and decoding.

Various embodiments of the present invention provide data processing systems having a data decoder circuit. The data decoder circuit includes: a first comparator circuit, a second comparator circuit, a first set of row storage units, a second set of row storage units, a first routing circuit, and a second routing unit. The first set of row storage units includes at least three row storage units, and the second set of row storage units includes at least three row storage units. The first routing circuit is operable to route any one of the outputs of only the first set of row storage units to the first comparator circuit, and the second routing circuit is operable to route any one of the outputs of only the second set of row storage units to the second comparator circuit.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b shows a circuit portion showing an example of wiring required to implement a variable code rate supporting the twelve row H-matrix of FIG. 2a;

FIG. 3b shows a flexible variable code rate support circuit in accordance with one or more embodiments of the present invention able to implement a variable code rate supporting the twelve row H-matrix of FIG. 3a;

FIG. 4b shows a flexible variable code rate support circuit in accordance with one or more embodiments of the present invention able to implement a variable code rate supporting the twelve row H-matrix of FIG. 4a;

DETAILED DESCRIPTION OF SOME EMBODIMENTS

Embodiments are related to systems and methods for data processing, and more particularly to systems and methods for data encoding and decoding.

Some embodiments of the present invention exploit a constraint to the H matrix structure, such that the check units within a data decoder circuit only need to be connected to a subset of the checks, and thus routing is simplified. Using this architecture, variable code rates can be supported. In some cases, overlapping between check layers is used to allow for more flexible distribution of row weights. Such overlapping controllably increases routing complexity when compared to non-constrained H-matrices.

Various embodiments of the present invention provide data processing systems having a data decoder circuit. The data decoder circuit includes: a first comparator circuit, a second comparator circuit, a first set of row storage units, a second set of row storage units, a first routing circuit, and a second routing unit. The first set of row storage units includes at least two row storage units, and the second set of row storage units includes at least two row storage units. The first routing circuit is operable to route any one of the outputs of only the first set of row storage units to the first comparator circuit, and the second routing circuit is operable to route any one of the outputs of only the second set of row storage units to the second comparator circuit.

In some instances of the aforementioned embodiments, the data decoder circuit further includes: a third routing circuit operable to route an output of the first comparator circuit to only a subset of the first set of row storage units, and a fourth routing circuit operable to route an output of the second comparator circuit to only a subset of the second set of row storage units. In one or more instances of the aforementioned embodiments, the data decoder circuit implements a low density parity check decoding algorithm.

In various instances of the aforementioned embodiments, the data decoding circuit complies with a constrained H-matrix having at least a first section and a second section. The first section is processed by the first comparator circuit, and the second section is processed by the second comparator circuit. In some cases, at most one non-zero location is allowed per each column of the H-matrix in the first section, and at most one non-zero location is allowed per each column of the H-matrix in the second section. In some such cases, the H-matrix includes an overlap where at least one and less than all of the row storage units of the at least three row storage units in the first set of row storage units is also included in the second set of row storage units. In one particular case, the overlap allows for increased row weight distribution in the H-matrix.

In some instances of the aforementioned embodiments, none of the at least three row storage units in the first set of row storage units is included in the second set of row storage units. In one or more instances of the aforementioned embodiments, the first comparator circuit is operable to compare an output of one of the first set of row storage units routed by the first routing circuit with a received variable node to check node message; and the second comparator circuit is operable to compare an output of one of the second set of row storage units routed by the second routing circuit with the received variable node to check node message. In some cases, the system is implemented as part of an integrated circuit. In various cases, the system is implemented as part of a storage device. The storage devices include: a storage medium, and a read/write head assembly disposed in relation to the storage medium. In such cases, the data processed by the data decoder circuit is derived by sensing information stored on the storage medium using the read/write head assembly.

Other embodiments of the present invention provide methods for data decoding. The methods include: receiving an encoded data set, wherein the encoded data set conforms to a constrained H-matrix; providing a data decoder circuit including a first comparator circuit, a second comparator circuit, a first set of row storage units, a second set of row storage units, a first routing circuit, and a second routing unit, wherein the first set of row storage units includes at least three row storage units, where the second set of row storage units includes at least three row storage units, wherein the first routing circuit is operable to route any one of the outputs of only the first set of row storage units to the first comparator circuit. The second routing circuit is operable to route any one of the outputs of only the second set of row storage units to the second comparator circuit. The method further includes applying a data decoding algorithm by the data decoder circuit to the encoded data set to yield a decoded output.

In various instances of the aforementioned embodiments, the data decoder circuit further includes: a third routing circuit operable to route an output of the first comparator circuit to only a subset of the first set of row storage units; and a fourth routing circuit operable to route an output of the second comparator circuit to only a subset of the second set of row storage units. in some instances of the aforementioned embodiments, the constrained H-matrix has at least a first section and a second section, the first section is processed by the first comparator circuit, and the second section is processed by the second comparator circuit. In some cases, at most one non-zero location is allowed per each column of the H-matrix in the first section, and at most one non-zero location is allowed per each column of the H-matrix in the second section. In particular cases, the H-matrix includes an overlap where at least one and less than all of the row storage units of the at least three row storage units in the first set of row storage units is also included in the second set of row storage units. In one particular case, the overlap allows for increased row weight distribution in the H-matrix.

In some instances of the aforementioned embodiments, none of the at least three row storage units in the first set of row storage units is included in the second set of row storage units. In one or more cases, the first comparator circuit is operable to compare an output of one of the first set of row storage units routed by the first routing circuit with a received variable node to check node message; and the second comparator circuit is operable to compare an output of one of the second set of row storage units routed by the second routing circuit with the received variable node to check node message.

Figure 1A:
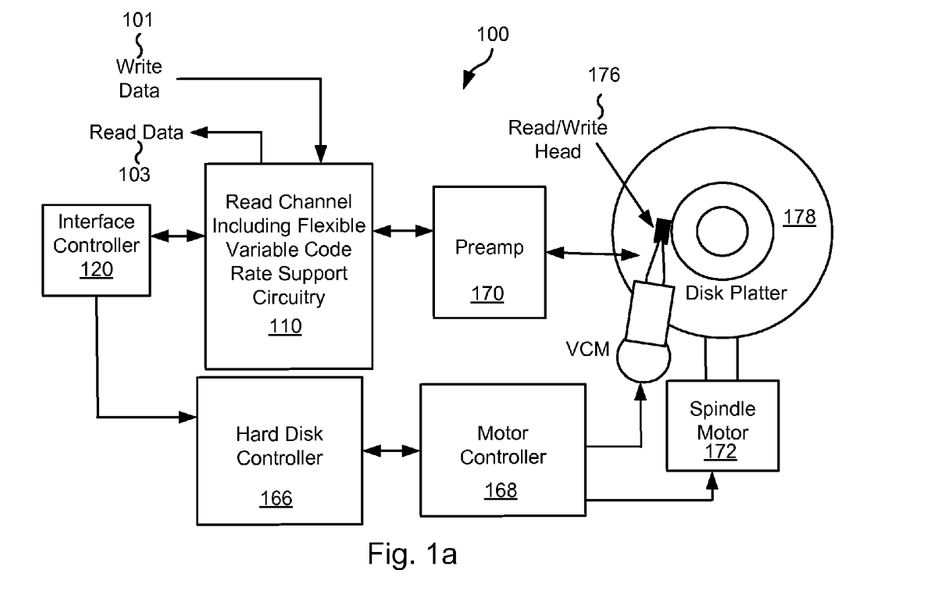
FIG. 1a shows a storage system including a read channel utilizing flexible variable code rate support circuitry in accordance with some embodiments of the present invention.

Turning to FIG. 1a, a storage system 100 including a read channel circuit 110 utilizing flexible variable code rate support circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly locationed over disk platter 178. In one embodiment, disk platter 178 includes magnetic signals recorded in accordance with either a longitudinal or a perpendicular recording scheme.

In a typical read operation, read/write head assembly 176 is accurately locationed by motor controller 168 over a desired data track on disk platter 178. Motor controller 168 both locations read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is locationed adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Figure 1B:
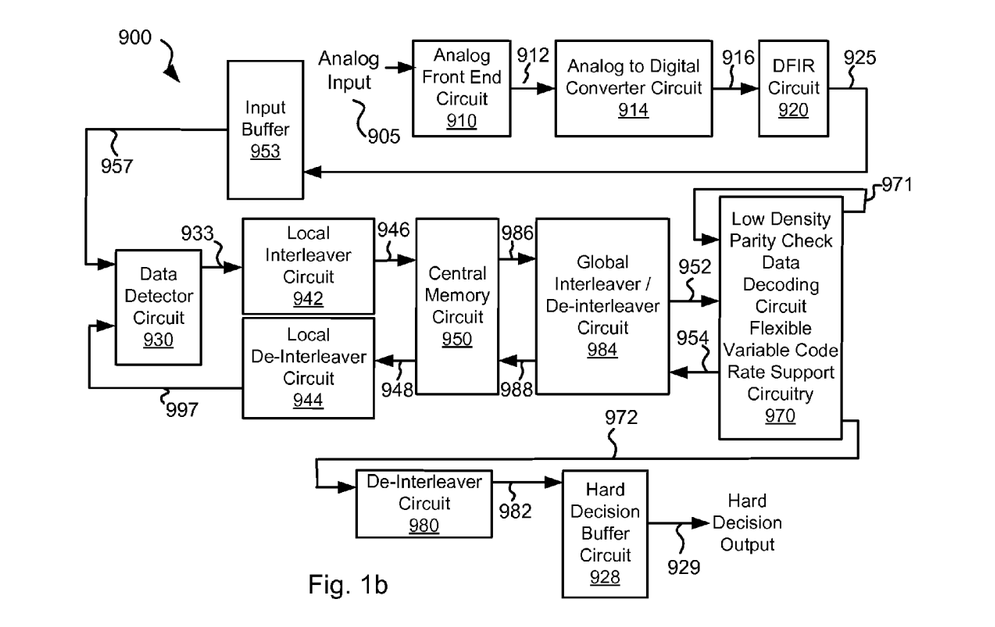
FIG. 1b shows one implementation of the read channel of FIG. 1 including a low density parity check data decoding circuit having flexible variable code rate support circuitry in accordance with various embodiments of the present invention.

Turning to FIG. 1b, one implementation (i.e., data processing system 900) of read channel circuit 110 of FIG. 1a including a low density parity check data decoding circuit 970 having flexible variable code rate support circuitry is shown in accordance with various embodiments of the present invention. Data processing system 900 includes an analog front end circuit 910 that receives an analog signal 905. Analog front end circuit 910 processes analog signal 905 and provides a processed analog signal 912 to an analog to digital converter circuit 914. Analog front end circuit 910 may include, but is not limited to, an analog filter and an amplifier circuit as are known in the art. Based upon the disclosure provided herein, one of ordinary skill in the art will recognize a variety of circuitry that may be included as part of analog front end circuit 910. In some cases, analog signal 905 is derived from a read/write head assembly (not shown) that is disposed in relation to a storage medium (not shown). In other cases, analog signal 905 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 905 may be derived.

Analog to digital converter circuit 914 converts processed analog signal 912 into a corresponding series of digital samples 916. Analog to digital converter circuit 914 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 916 are provided to an equalizer circuit 920. Equalizer circuit 920 applies an equalization algorithm to digital samples 916 to yield an equalized output 925. In some embodiments of the present invention, equalizer circuit 920 is a digital finite impulse response filter circuit as are known in the art. It may be possible that equalized output 925 may be received directly from a storage device in, for example, a solid state storage system. In such cases, analog front end circuit 910, analog to digital converter circuit 914 and equalizer circuit 920 may be eliminated where the data is received as a digital data input. Equalized output 925 is stored to an input buffer 953 that includes sufficient memory to maintain a number of codewords until processing of that codeword is completed through a data detector circuit 930 and low density parity check (LDPC) decoding circuit 970 including, where warranted, multiple global iterations (passes through both data detector circuit 930 and LDPC decoding circuit 970) and/or local iterations (passes through LDPC decoding circuit 970 during a given global iteration). An output 957 is provided to data detector circuit 930.

Data detector circuit 930 may be a single data detector circuit or may be two or more data detector circuits operating in parallel on different codewords. Whether it is a single data detector circuit or a number of data detector circuits operating in parallel, data detector circuit 930 is operable to apply a data detection algorithm to a received codeword or data set. In some embodiments of the present invention, data detector circuit 930 is a Viterbi algorithm data detector circuit as are known in the art. In other embodiments of the present invention, data detector circuit 930 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 930 is used to apply the data detection algorithm to the received codeword for a first global iteration applied to the received codeword, and another data detector circuit included in data detector circuit 930 is operable apply the data detection algorithm to the received codeword guided by a decoded output accessed from a central memory circuit 950 on subsequent global iterations.

Upon completion of application of the data detection algorithm to the received codeword on the first global iteration, data detector circuit 930 provides a detector output 933. Detector output 933 includes soft data. As used herein, the phrase "soft data" is used in its broadest sense to mean reliability data with each instance of the reliability data indicating a likelihood that a corresponding bit location or group of bit locations has been correctly detected. In some embodiments of the present invention, the soft data or reliability data is log likelihood ratio data as is known in the art. Detector output 933 is provided to a local interleaver circuit 942. Local interleaver circuit 942 is operable to shuffle sub-portions (i.e., local chunks) of the data set included as detected output and provides an interleaved codeword 946 that is stored to central memory circuit 950. Local interleaver circuit 942 may be any circuit known in the art that is capable of shuffling data sets to yield a re-arranged data set. Interleaved codeword 946 is stored to central memory circuit 950.

Once LDPC decoding circuit 970 is available, a previously stored interleaved codeword 946 is accessed from central memory circuit 950 as a stored codeword 986 and globally interleaved by a global interleaver/de-interleaver circuit 984. Global interleaver/de-interleaver circuit 984 may be any circuit known in the art that is capable of globally rearranging codewords. Global interleaver/De-interleaver circuit 984 provides a decoder input 952 into LDPC decoding circuit 970. LDPC decoding circuit 970 applies one or more iterations or a layered data decoding algorithm to decoder input 952 to yield a decoded output 971. In cases where another local iteration (i.e., another pass through LDPC decoding circuit 970) is desired (i.e., decoding failed to converge and more local iterations are allowed), LDPC decoding circuit 970 re-applies the layered data decoding algorithm to decoder input 952 guided by decoded output 971. This continues until either a maximum number of local iterations is exceeded or decoded output 971 converges (i.e., completion of standard processing).

Low density parity check data decoding circuit 970 includes flexible variable code rate support circuitry. Such flexible variable code rate support circuitry provides for constrained distribution of min1/min2 comparison by providing a number of min1/min2 comparators circuits corresponding to the maximum column weight of the codes to be processed by low density parity check data decoding circuit 970. The codes to be processed by low density parity check data decoding circuit 970 are segregated into a number of bands equivalent to the maximum column weight of the codes, and the non-zero locations in the codes are distributed across the bands with at most one non-zero value in each of the bands. In some cases, the bands overlap. As used herein, the term "constrained distribution" is used in its broadest sense to mean any constraint where at least one non-zero value in a column of the code can only be distributed to less than any of the min1/min2 comparator circuits.

Where decoded output 971 fails to converge (i.e., fails to yield the originally written data set) and a number of local iterations through LDPC decoding circuit 970 exceeds a threshold, but an allowable number of global iterations is not yet exceeded, the resulting decoded output is provided as a decoded output 954 back to central memory circuit 950 where it is stored awaiting another global iteration through a data detector circuit included in data detector circuit 930. Prior to storage of decoded output 954 to central memory circuit 950, decoded output 954 is globally de-interleaved to yield a globally de-interleaved output 988 that is stored to central memory circuit 950. The global de-interleaving reverses the global interleaving earlier applied to stored codeword 986 to yield decoder input 952. When a data detector circuit included in data detector circuit 930 becomes available, a previously stored de-interleaved output 988 is accessed from central memory circuit 950 and locally de-interleaved by a de-interleaver circuit 944. De-interleaver circuit 944 re-arranges decoder output 948 to reverse the shuffling originally performed by interleaver circuit 942. A resulting de-interleaved output 997 is provided to data detector circuit 930 where it is used to guide subsequent detection of a corresponding data set previously received as equalized output 925.

Alternatively, where the decoded output converges (i.e., yields the originally written data set), the resulting decoded output is provided as an output codeword 972 to a de-interleaver circuit 980 that rearranges the data to reverse both the global and local interleaving applied to the data to yield a de-interleaved output 982. De-interleaved output 982 is provided to a hard decision buffer circuit 928 buffers de-interleaved output 982 as it is transferred to the requesting host as a hard decision output 929.

As yet another alternative, where decoded output 971 fails to converge (i.e., fails to yield the originally written data set), a number of local iterations through LDPC decoding circuit 970 exceeds a threshold, and a number of global iterations through data detector circuit 930 and LDPC data decoding circuit 970 exceeds a threshold, the result of the last pass through LDPC decoding circuit 970 is provided as a decoded output along with an error indicator (not shown).

Figure 2A:
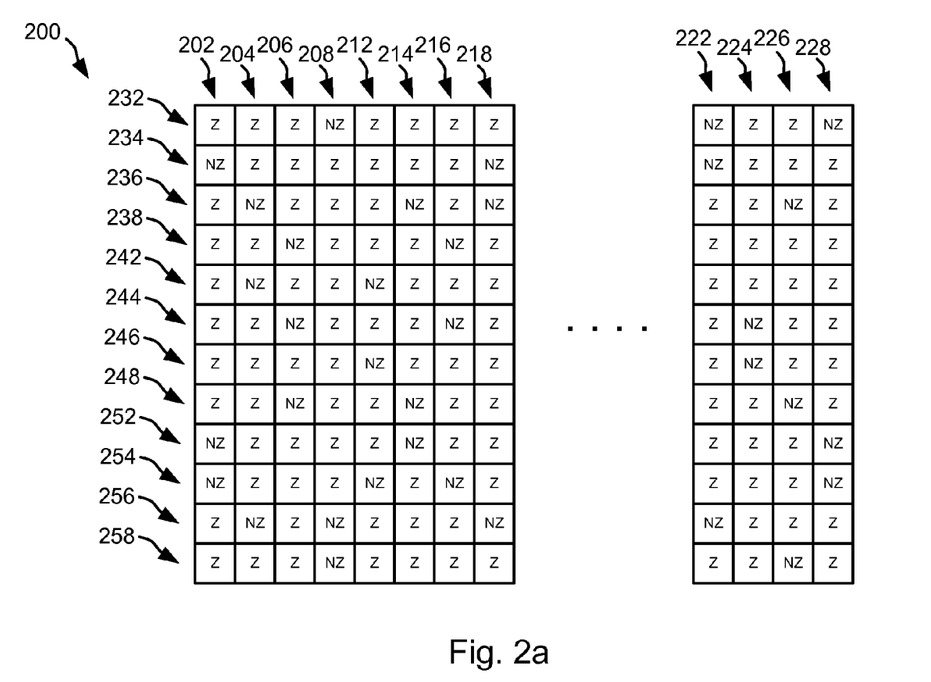
FIG. 2a shows an example of a twelve row H-matrix with a column weight of three.

Turning to FIG. 2a, an example of a twelve row H-matrix 200 with a column weight of three is shown. As shown, twelve row H-matrix 200 includes twelve rows (i.e., rows 232, 234, 236, 238, 242, 244, 246, 248, 252, 254, 256, 258) and a number of columns (i.e., columns 202, 204, 206, 208, 212, 214, 216, 218, 222, 224, 226, 228). As twelve row H-matrix 200 exhibits a column weight of three, each of columns 202, 204, 206, 208, 212, 214, 216, 218, 222, 224, 226, 228 includes at most three non-zero ("NZ") values with the other locations being occupied by zeros ("Z"). In some cases, the non-zero values are non-zero circulants, and the zero values are zero circulants. Twelve row H-matrix 200 is "non-constrained" as the non-zero locations, while being limited to three per column, can occur in any row of a given column. Because twelve row H-matrix 200 is non-constrained as that term is used herein, with exception of row 232 and row 258, all other rows must be connected to at least two min1/min2 comparator circuits. Such routing may be impractical, especially where the number of rows increases. It should be noted that twelve row H-matrix 200 is an example, and that other example H-matrices may have higher or lower column weights and more or fewer than twelve rows.

Figure 2B:
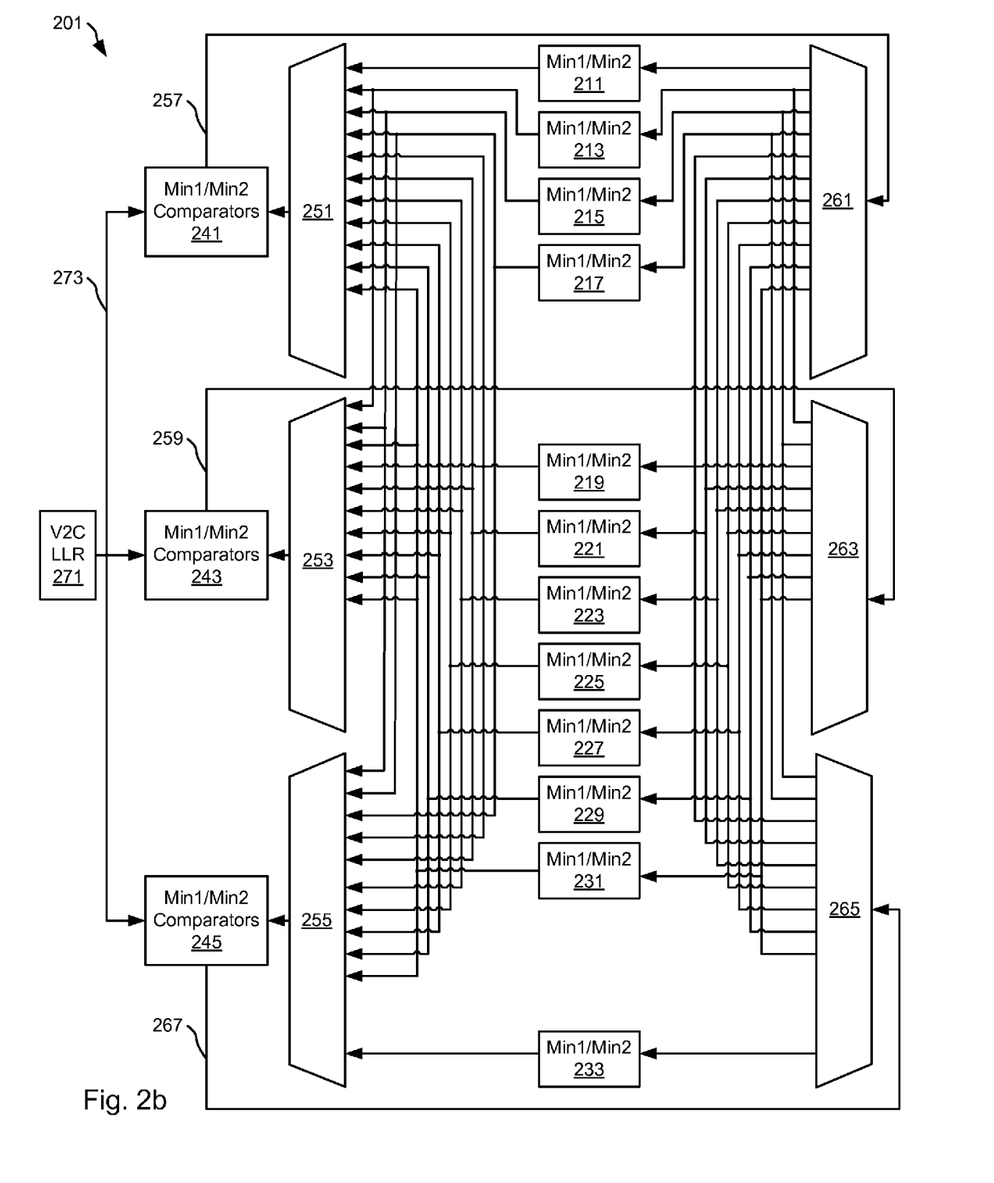

Turning to FIG. 2b, a circuit portion 201 shows an example of wiring required to implement a variable code rate supporting twelve row H-matrix 200. As shown, because twelve row H-matrix 200 has a column weight of three, circuit portion 201 includes three min1/min2 comparator circuits (i.e., a min1/min2 comparator circuit 241, a min1/min2 comparator circuit 243, and a min1/min2 comparator circuit 245). A variable node to check node soft data generator circuit (V2C LLR) 271 provides a soft data message 273 to each of min1/min2 comparator circuit 241, min1/min2 comparator circuit 243, and min1/min2 comparator circuit 245. Min1/min2 comparator circuit 241 compares a routed min1/min2 value from a routing matrix 251 (in some cases, routing matrix 251 is a multiplexer circuit as are known in the art) to yield an updated min1/min2 value 257; min1/min2 comparator circuit 243 compares a routed min1/min2 value from a routing matrix 253 (in some cases, routing matrix 253 is a multiplexer circuit as are known in the art) to yield an updated min1/min2 value 259; and min1/min2 comparator circuit 245 compares a routed min1/min2 value from a routing matrix 255 (in some cases, routing matrix 255 is a multiplexer circuit as are known in the art) to yield an updated min1/min2 value 267.

Min1/min2 value 257 is provided to a routing matrix 261 (in some cases, routing matrix 261 is a de-multiplexer circuit as are known in the art); min1/min2 value 259 is provided to a routing matrix 263 (in some cases, routing matrix 263 is a de-multiplexer circuit as are known in the art); and min1/min2 value 267 is provided to a routing matrix 261 (in some cases, routing matrix 265 is a de-multiplexer circuit as are known in the art). Routing matrix 261 distributes min1/min2 value 257 to any of eleven of twelve row storage units (i.e., a min1/min2 211, a min1/min2 213, a min1/min2 215, a min1/min2 217, a min1/min2 219, a min1/min2 221, a min1/min2 223, a min1/min2 225, a min1/min2 227, a min1/min2 229, and a min1/min2 231) corresponding to respective rows of twelve row H-matrix 200. Routing matrix 263 distributes min1/min2 value 259 to any of ten of twelve row storage units (i.e., min1/min2 213, min1/min2 215, min1/min2 217, min1/min2 219, min1/min2 221, min1/min2 223, min1/min2 225, min1/min2 227, min1/min2 229, and min1/min2 231) corresponding to respective rows of twelve row H-matrix 200 depending upon the location of zero within a column being processed. Routing matrix 265 distributes min1/min2 value 267 to any of eleven of twelve row storage units (i.e., min1/min2 213, min1/min2 215, min1/min2 217, min1/min2 219, min1/min2 221, min1/min2 223, min1/min2 225, min1/min2 227, min1/min2 229, min1/min2 231, and a min1/min2 233) corresponding to respective rows of twelve row H-matrix 200. Such routing allows for decoding the non-constrained twelve row H-matrix 200 of FIG. 2a. As is shown, such routing is complex, and may be impractical.

The output of min1/min2 211 is provided to routing matrix 251. The output of min1/min2 213 is provided to routing matrix 251 and routing matrix 253. The output of min1/min2 215 is provided to routing matrix 251, routing matrix 253 and routing matrix 255. The output of min1/min2 217 is provided to routing matrix 251, routing matrix 253 and routing matrix 255. The output of min1/min2 219 is provided to routing matrix 251, routing matrix 253 and routing matrix 255. The output of min1/min2 221 is provided to routing matrix 251, routing matrix 253 and routing matrix 255. The output of min1/min2 223 is provided to routing matrix 251, routing matrix 253 and routing matrix 255. The output of min1/min2 225 is provided to routing matrix 251, routing matrix 253 and routing matrix 255. The output of min1/min2 227 is provided to routing matrix 251, routing matrix 253 and routing matrix 255. The output of min1/min2 229 is provided to routing matrix 251, routing matrix 253 and routing matrix 255. The output of min1/min2 231 is provided to routing matrix 255. Such routing allows for routing the respective min1/min2 values to min1/min2 comparator circuits 241, 243, 245 depending upon twelve row H-matrix 200 of FIG. 2a. As is shown, such routing is complex, and may be impractical.

Figure 3A:
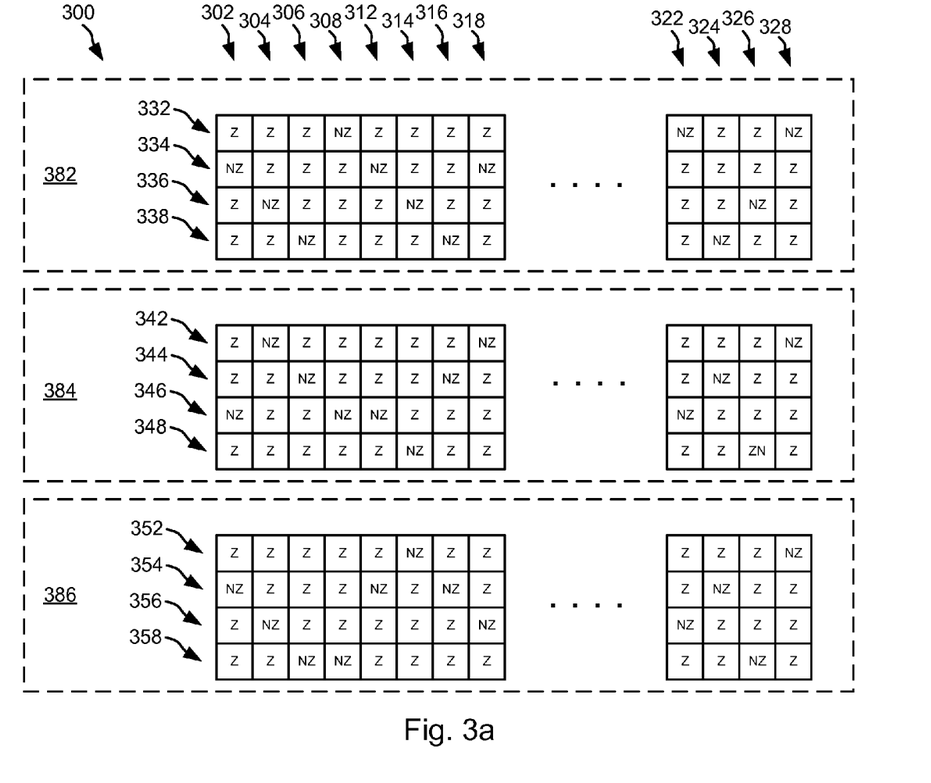
FIG. 3a shows a constrained twelve row H-matrix with a column weight of three without section overlap in accordance with various embodiments of the present invention.

Turning to FIG. 3a, a constrained twelve row H-matrix 300 having a column weight of three and without section overlap is shown in accordance with various embodiments of the present invention. As shown, twelve row H-matrix 300 includes twelve rows (i.e., rows 332, 334, 336, 338, 342, 344, 346, 348, 352, 354, 356, 358) and a number of columns (i.e., columns 302, 304, 306, 308, 312, 314, 316, 318, 322, 324, 326, 328). As twelve row H-matrix 300 exhibits a column weight of three, each of columns 302, 304, 306, 308, 312, 314, 316, 318, 322, 324, 326, 328 includes at most three non-zero ("NZ") values with the other locations being occupied by zeros ("Z"). Twelve row H-matrix 300 is "constrained" as the non-zero locations, while being limited to three per column, additionally are limited to occurring such that at most there is one non-zero location within each column passing through the three sections 382, 384, 386 or bands. Each of the three sections 382, 384, 386 corresponds to a respective min1/min2 comparator circuit within a data decoding circuit used to process the codeword conforming to twelve row H-matrix 300. By limiting the occurrence of non-zero locations within each of sections 382, 384, 386, variable rate coding is still supportable but without the complex routing required in the non-constrained example of FIG. 2a. It should be noted that twelve row H-matrix 300 is one embodiment, and that other example H-matrices may have higher or lower column weights, more or fewer than twelve rows, and/or more or fewer than three sections. Using fewer sections constrained to one non-zero location per column in each section would utilize fewer min1/min2 comparator circuits. Correspondingly, using more sections constrained to one non-zero location per column in each section would utilize more min1/min2 comparator circuits.

Figure 3B:
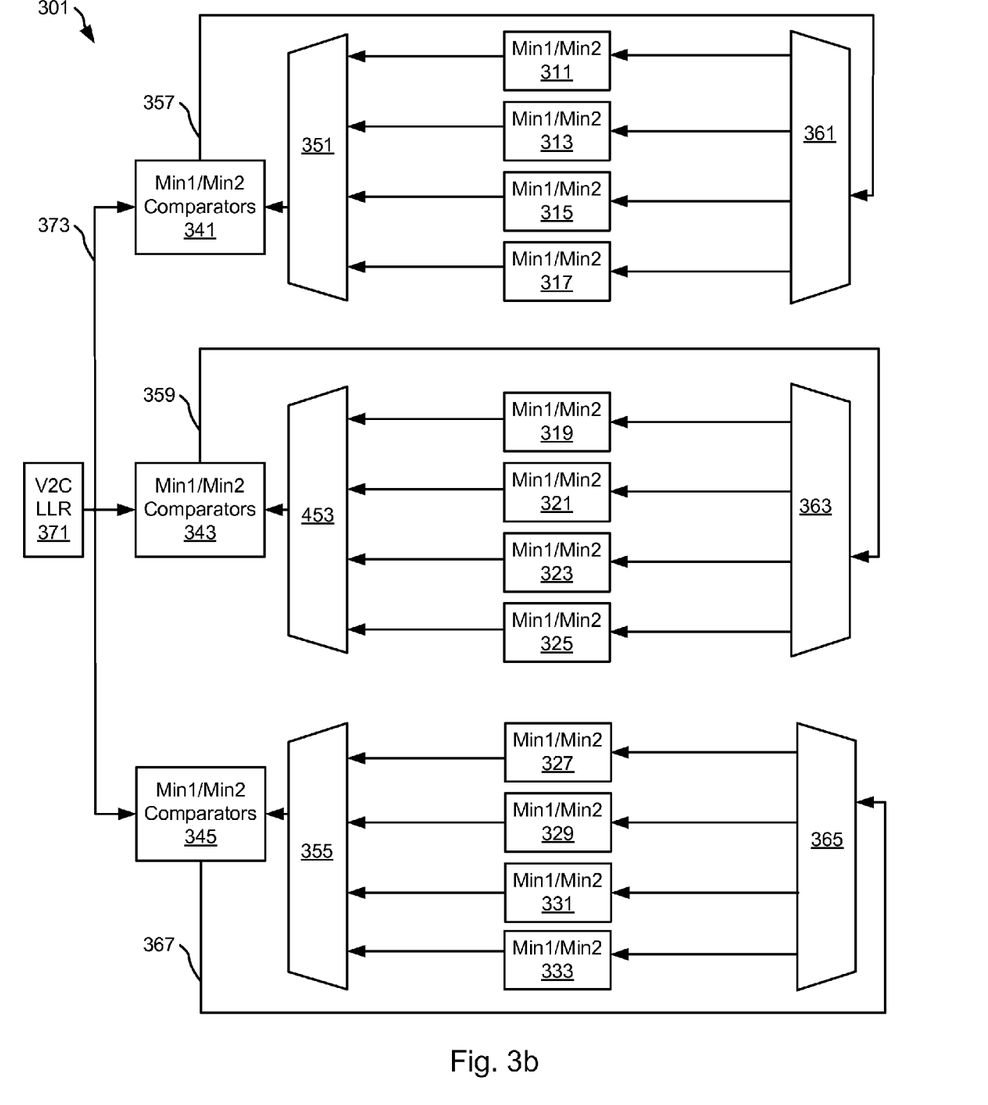

Turning to FIG. 3b, a flexible variable code rate support circuit 301 is shown in accordance with one or more embodiments of the present invention able to implement a variable code rate supporting the twelve row H-matrix of FIG. 3a. As shown, because twelve row H-matrix 300 has a column weight of three (an correspondingly three sections 382, 384, 386), flexible variable code rate support circuit 301 includes three min1/min2 comparator circuits (i.e., a min1/min2 comparator circuit 341, a min1/min2 comparator circuit 343, and a min1/min2 comparator circuit 345). Again, where a different column weight is used, a different number of min1/min2 comparator circuits would be used.

A variable node to check node soft data generator circuit (V2C LLR) 371 provides a soft data message 373 to each of min1/min2 comparator circuit 341, min1/min2 comparator circuit 343, and min1/min2 comparator circuit 345. Min1/min2 comparator circuit 341 compares a routed min1/min2 value from a routing matrix 351 (in some cases, routing matrix 351 is a multiplexer circuit as are known in the art) to yield an updated min1/min2 value 357; min1/min2 comparator circuit 343 compares a routed min1/min2 value from a routing matrix 353 (in some cases, routing matrix 353 is a multiplexer circuit as are known in the art) to yield an updated min1/min2 value 359; and min1/min2 comparator circuit 345 compares a routed min1/min2 value from a routing matrix 355 (in some cases, routing matrix 355 is a multiplexer circuit as are known in the art) to yield an updated min1/min2 value 367.

Min1/min2 value 357 is provided to a routing matrix 361 (in some cases, routing matrix 361 is a de-multiplexer circuit as are known in the art); min1/min2 value 359 is provided to a routing matrix 363 (in some cases, routing matrix 363 is a de-multiplexer circuit as are known in the art); and min1/min2 value 367 is provided to a routing matrix 365 (in some cases, routing matrix 365 is a de-multiplexer circuit as are known in the art). Routing matrix 361 distributes min1/min2 value 357 to a subset of row storage units (i.e., a min1/min2 311, a min1/min2 313, a min1/min2 315, or a min1/min2 317) corresponding to respective rows of twelve row H-matrix 300 included within section 382. Said another way, by only allowing one non-zero location per column within section 382, routing matrix 361 is only required to provide for selectable routing of min1/min2 value 357 to one of the four row storage units corresponding to section 382. Similarly, routing matrix 363 distributes min1/min2 value 359 to a subset of row storage units (i.e., a min1/min2 319, a min1/min2 321, a min1/min2 323, or a min1/min2 325) corresponding to respective rows of twelve row H-matrix 300 included within section 384. Said another way, by only allowing one non-zero location per column within section 384, routing matrix 363 is only required to provide for selectable routing of min1/min2 value 359 to one of the four row storage units corresponding to section 382. Similarly, routing matrix 365 distributes min1/min2 value 367 to a subset of row storage units (i.e., a min1/min2 327, a min1/min2 329, a min1/min2 331, or a min1/min2 333) corresponding to respective rows of twelve row H-matrix 300 included within section 386. Said another way, by only allowing one non-zero location per column within section 386, routing matrix 365 is only required to provide for selectable routing of min1/min2 value 367 to one of the four row storage units corresponding to section 386.

The outputs from min1/min2 311, min1/min2 313, min1/min2 315, and min1/min2 317 are only provided to routing matrix 351 supporting section 382. The outputs from min1/min2 319, min1/min2 321, min1/min2 323, and min1/min2 325 are only provided to routing matrix 353 supporting section 384. The outputs from min1/min2 327, min1/min2 329, min1/min2 331, and min1/min2 333 are only provided to routing matrix 355 supporting section 386. Such routing allows for routing the respective min1/min2 values to min1/min2 comparator circuits 341, 343, 345 depending upon the zero locations in twelve row H-matrix 300 of FIG. 3a. As is shown, such routing is greatly simplified compared to the support required for the non-constrained H-matrix of FIG. 2a.

It should be noted that in any column where there are fewer non-zero locations than that allowed by the column weight (e.g., there are only two non-zero locations in a code having a column weight of three), one or more of sections 382, 384, 386 will not have a non-zero location for that particular column. In such a circumstance, the corresponding min1/min2 comparator circuit 341, 343, 345 for the particular section is not used (i.e., operation or computation is not performed by that circuit for the particular column).

Figure 5:
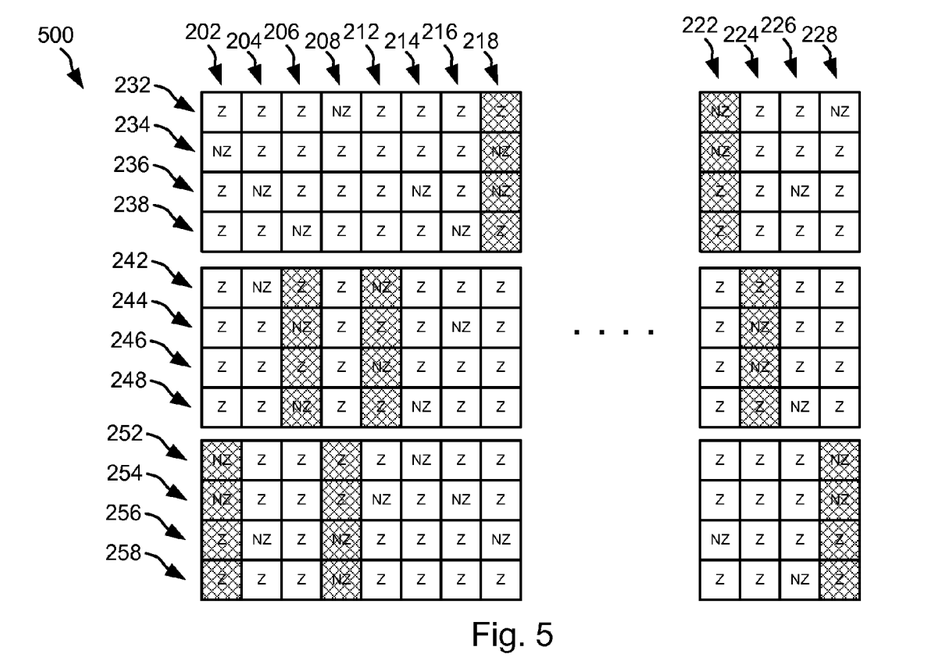
FIG. 5 is the example of a twelve row H-matrix of FIG. 2a modified to show non-compliant columns that must be constrained to support processing by the flexible variable code rate support circuit of FIG. 3b.

Turing to FIG. 5, the example twelve row H-matrix 200 is shown again as a marked up matrix 400. Marked up matrix 400 is identical to twelve row H-matrix 200 except that columns that do not comply with the constraint required by flexible variable code rate support circuit 301 are crosshatched. In particular, columns 202, 206, 208, 212, 218, 222, 224 and 228 are non-compliant. Using column 202 as an example, two non-zero locations (row 252, row 254) occur within the same section (i.e., section 386) and therefore do not meet the constraint.

Figure 4A:
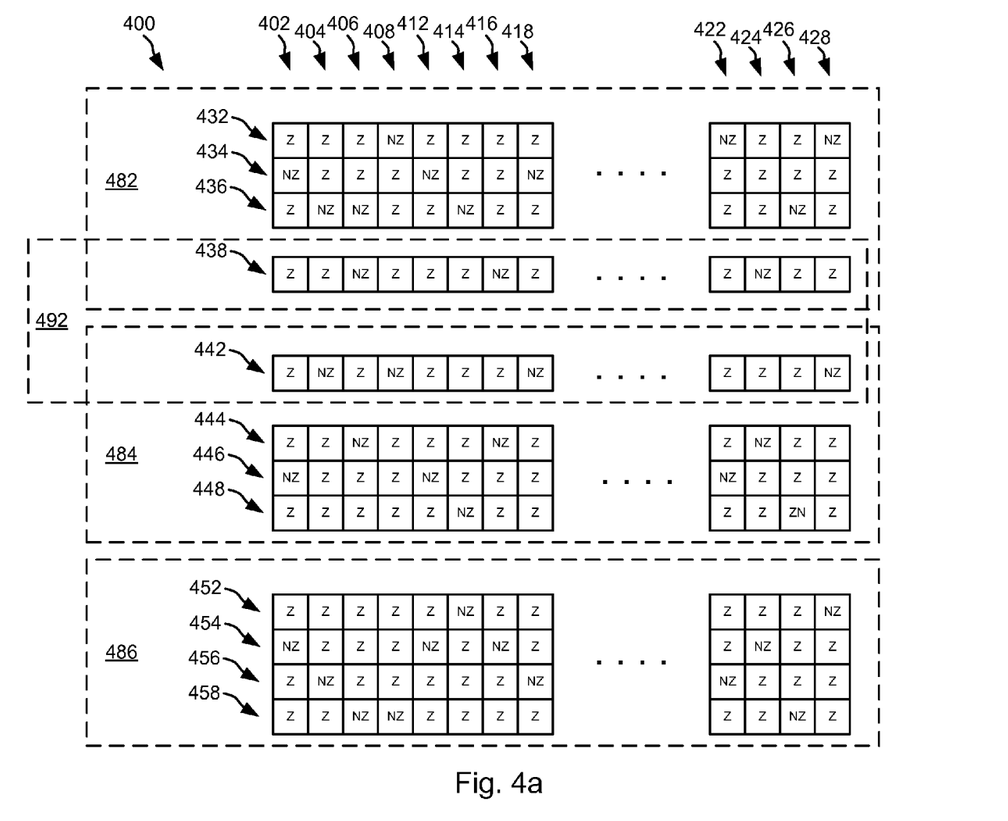
FIG. 4a shows a constrained twelve row H-matrix with a column weight of three and exhibiting section overlap in accordance with various embodiments of the present invention.

Turning to FIG. 4a, a constrained twelve row H-matrix 400 having a column weight of three and exhibiting section overlap is shown in accordance with various embodiments of the present invention. As shown, twelve row H-matrix 400 includes twelve rows (i.e., rows 432, 434, 436, 438, 442, 444, 446, 448, 452, 454, 456, 458) and a number of columns (i.e., columns 402, 404, 406, 408, 412, 414, 416, 418, 422, 424, 426, 428). As twelve row H-matrix 400 exhibits a column weight of three, each of columns 402, 404, 406, 408, 412, 414, 416, 418, 422, 424, 426, 428 includes at most three non-zero ("NZ") values with the other locations being occupied by zeros ("Z"). Twelve row H-matrix 400 is "constrained" as the non-zero locations, while being limited to three per column, additionally are limited to occurring such that at most there is one non-zero location within each column passing through the three sections 482, 484, 486 or bands where sections 482, 484 are allowed to overlap. Thus, where column 406 having two non-zero locations (i.e., at rows 436, 438) within section 482 would not be supported by flexible variable code rate support circuit 301 of FIG. 3b, it is supported by a flexible variable code rate support circuit 401 of FIG. 4b where an overlap 492 is defined. In this case, overlap 492 allows row 438 to be processed either as part of section 482 or section 484, and allows row 442 to be processed either as part of section 482 or section 484. This overlap allows for more flexibility in developing a compliant code, but still provides sufficient constraint to allow for practical routing of a data decoding circuit.

Each of the three sections 482, 484, 486 corresponds to a respective min1/min2 comparator circuit within a data decoding circuit used to process the codeword conforming to twelve row H-matrix 400. By limiting the occurrence of non-zero locations within each of sections 482, 484, 486, variable rate coding is still supportable but without the complex routing required in the non-constrained example of FIG. 2a. It should be noted that twelve row H-matrix 400 is one embodiment, and that other example H-matrices may have higher or lower column weights, more or fewer than twelve rows, and/or more or fewer than three sections. Using fewer sections constrained to one non-zero location per column in each section would utilize fewer min1/min2 comparator circuits. Correspondingly, using more sections constrained to one non-zero location per column in each section would utilize more min1/min2 comparator circuits. Further, more overlaps may be defined. For example, overlap 492 may be extended to incorporate more rows of either or both of section 482 and section 484. As another example, another overlap may be defined between section 484 and section 486. The tradeoff of such overlaps being an increase in routing complexity and a corresponding increase in code flexibility as the amount of overlap is increased.

Figure 4B:
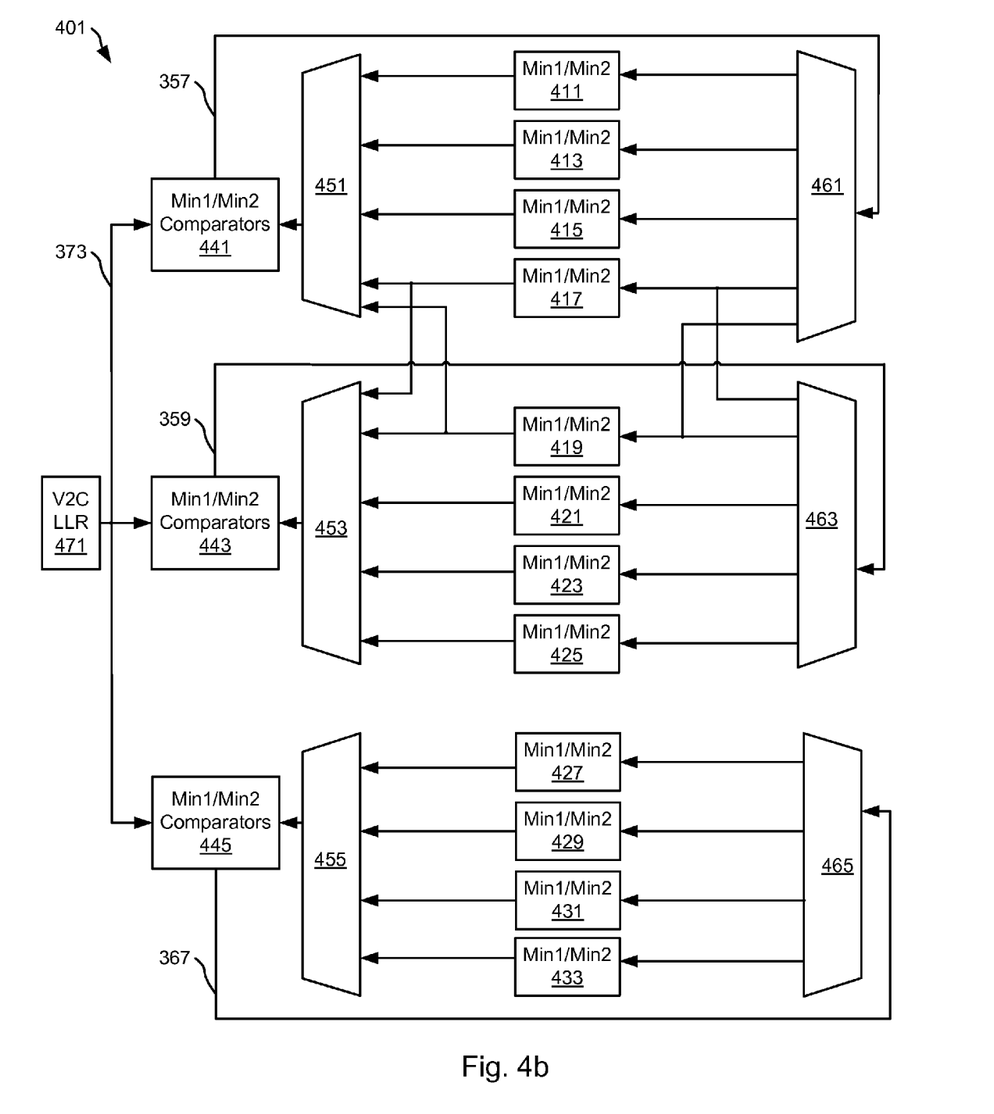

Turning to FIG. 4b, a flexible variable code rate support circuit 401 is shown in accordance with one or more embodiments of the present invention able to implement a variable code rate supporting the twelve row H-matrix of FIG. 4a. As shown, because twelve row H-matrix 400 has a column weight of three (an correspondingly three sections 482, 484, 486), flexible variable code rate support circuit 401 includes three min1/min2 comparator circuits (i.e., a min1/min2 comparator circuit 441, a min1/min2 comparator circuit 443, and a min1/min2 comparator circuit 445). Again, where a different column weight is used, a different number of min1/min2 comparator circuits would be used.

A variable node to check node soft data generator circuit (V2C LLR) 471 provides a soft data message 473 to each of min1/min2 comparator circuit 441, min1/min2 comparator circuit 443, and min1/min2 comparator circuit 445. Min1/min2 comparator circuit 441 compares a routed min1/min2 value from a routing matrix 451 (in some cases, routing matrix 451 is a multiplexer circuit as are known in the art) to yield an updated min1/min2 value 457; min1/min2 comparator circuit 443 compares a routed min1/min2 value from a routing matrix 453 (in some cases, routing matrix 453 is a multiplexer circuit as are known in the art) to yield an updated min1/min2 value 459; and min1/min2 comparator circuit 445 compares a routed min1/min2 value from a routing matrix 455 (in some cases, routing matrix 455 is a multiplexer circuit as are known in the art) to yield an updated min1/min2 value 467.

Min1/min2 value 457 is provided to a routing matrix 461 (in some cases, routing matrix 461 is a de-multiplexer circuit as are known in the art); min1/min2 value 459 is provided to a routing matrix 463 (in some cases, routing matrix 463 is a de-multiplexer circuit as are known in the art); and min1/min2 value 467 is provided to a routing matrix 465 (in some cases, routing matrix 465 is a de-multiplexer circuit as are known in the art). Routing matrix 461 distributes min1/min2 value 457 to a subset of row storage units (i.e., a min1/min2 411, a min1/min2 413, a min1/min2 415, a min1/min2 417, or a min1/min2 419) corresponding to respective rows of twelve row H-matrix 400 included within section 482. Of note, routing matrix 461 is able to distribute min1/min2 value 457 to min1/min2 419 that corresponds to overlap 492. Said another way, by only allowing one non-zero location per column within section 482 plus overlap 492, routing matrix 461 is only required to provide for selectable routing of min1/min2 value 457 to one of the five row storage units corresponding to section 482 plus overlap 492. Similarly, routing matrix 463 distributes min1/min2 value 459 to a subset of row storage units (i.e., min1/min2 417, min1/min2 419, a min1/min2 421, a min1/min2 423, or a min1/min2 425) corresponding to respective rows of twelve row H-matrix 400 included within section 484. Of note, routing matrix 463 is able to distribute min1/min2 value 459 to min1/min2 417 that corresponds to overlap 492. Said another way, by only allowing one non-zero location per column within section 484, routing matrix 463 is only required to provide for selectable routing of min1/min2 value 459 to one of the four row storage units corresponding to section 482 plus overlap 492. Similarly, routing matrix 465 distributes min1/min2 value 467 to a subset of row storage units (i.e., a min1/min2 427, a min1/min2 429, a min1/min2 431, or a min1/min2 433) corresponding to respective rows of twelve row H-matrix 400 included within section 486. Said another way, by only allowing one non-zero location per column within section 486, routing matrix 465 is only required to provide for selectable routing of min1/min2 value 467 to one of the four row storage units corresponding to section 486.

The outputs from min1/min2 411, min1/min2 413, min1/min2 415, min1/min2 417, min1/min2 419 are only provided to routing matrix 451 supporting section 482 plus overlap 492. The outputs from min1/min2 417, min1/min2 419, min1/min2 421, min1/min2 423, and min1/min2 425 are only provided to routing matrix 453 supporting section 484 plus overlap 492. The outputs from min1/min2 427, min1/min2 429, min1/min2 431, and min1/min2 433 are only provided to routing matrix 455 supporting section 486. Such routing allows for routing the respective min1/min2 values to min1/min2 comparator circuits 441, 443, 445 depending upon the zero locations in twelve row H-matrix 400 of FIG. 4a. As is shown, such routing is greatly simplified compared to the support required for the non-constrained H-matrix of FIG. 2a, but is more complicated than the H-matrix of FIG. 3a. The increased complexity compared with the H-matrix of FIG. 3a allows for a greater number of possible codes without rendering the layout too complex. Again, the tradeoff of overlaps such as overlap 492 results in an increase in routing complexity and a corresponding increase in code flexibility as the amount of overlap is increased.

It should be noted that in any column where there are fewer non-zero locations than that allowed by the column weight (e.g., there are only two non-zero locations in a code having a column weight of three), one or more of sections 482, 484, 486 will not have a non-zero location for that particular column. In such a circumstance, the corresponding min1/min2 comparator circuit 441, 443, 445 for the particular section is not used (i.e., operation or computation is not performed by that circuit for the particular column).

Figure 6A:
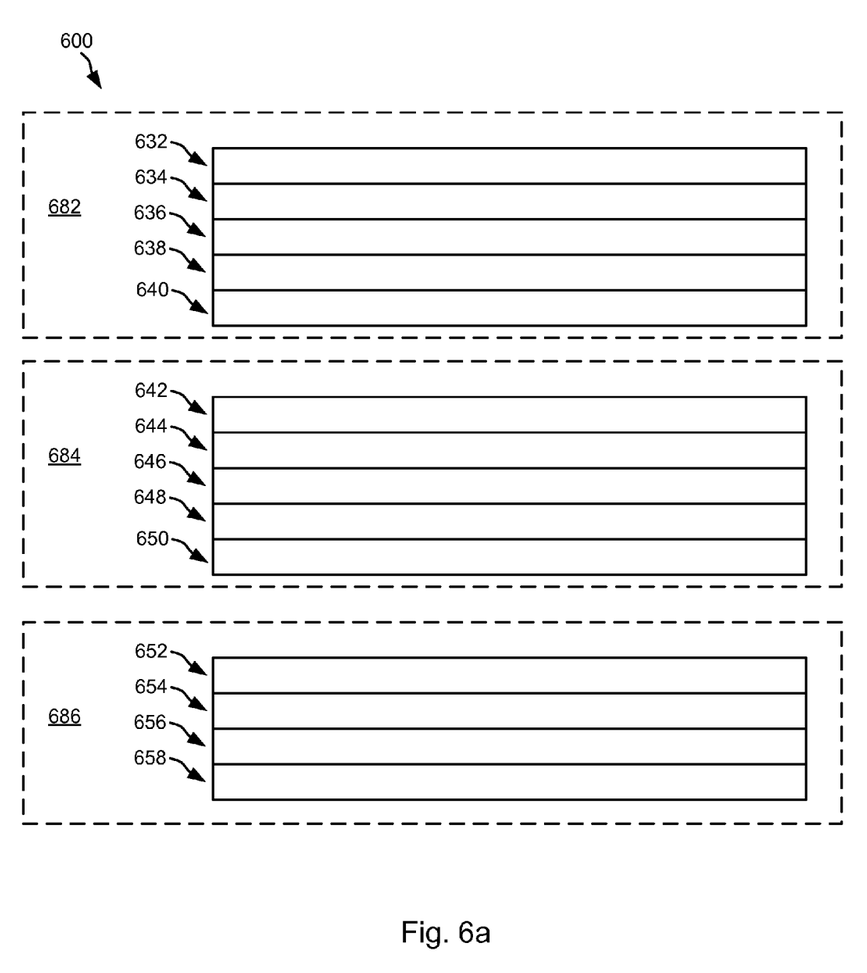
FIG. 6a is an example of a non-overlapping constraint that may be used to support a particular variable code rate in accordance with one embodiment of the present invention.

Turning to FIG. 6a, an example H-matrix 600 using a non-overlapping constraint that may be used to support a particular variable code rate (i.e., a 14 row code rate) is shown in accordance with one embodiment of the present invention. H-matrix 600 has a column weight of three and does not exhibit section overlap. As shown, H-matrix 600 includes fourteen rows (i.e., rows 632, 634, 636, 638, 640, 642, 644, 646, 648, 650, 652, 654, 656, 658) and a number of columns (not shown). As H-matrix 600 exhibits a column weight of three, each of the columns includes at most three non-zero ("NZ") values with the other locations being occupied by zeros ("Z"). H-matrix 600 is "constrained" as the non-zero locations, while being limited to three per column, additionally are limited to occurring such that at most there is one non-zero location within each column passing through the three sections 682, 684, 686 or bands. Each of the three sections 682, 684, 686 corresponds to a respective min1/min2 comparator circuit within a data decoding circuit used to process the codeword conforming to twelve row H-matrix 600. By limiting the occurrence of non-zero locations within each of sections 682, 684, 686, variable rate coding is still supportable but without the complex routing required in the non-constrained example of FIG. 2a.

Figure 6B:
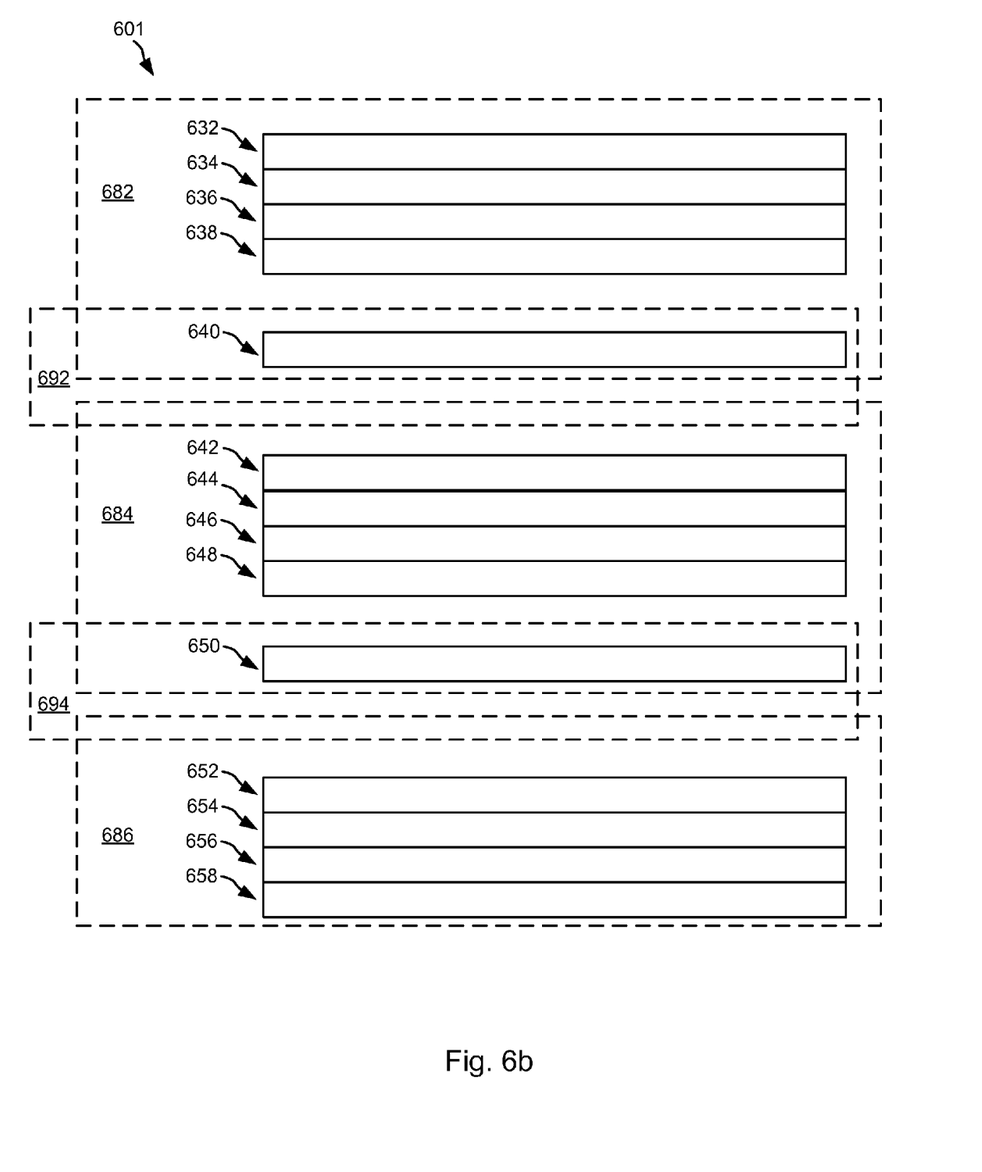
FIG. 6b is an example of an overlapping constraint that may be used to support the same variable code rate of FIG. 6a in accordance with another embodiment of the present invention.

Turning to FIG. 6b, an example H-matrix 601 using an overlapping constraint that may be used to support the same code rate (i.e., a 14 row code rate) as that of FIG. 6a is shown in accordance with another embodiment of the present invention. H-matrix 601 has a column weight of three and does not exhibit section overlap. As shown, H-matrix 601 includes fourteen rows (i.e., rows 632, 634, 636, 638, 640, 642, 644, 646, 648, 650, 652, 654, 656, 658) and a number of columns (not shown). As H-matrix 601 exhibits a column weight of three, each of the columns includes at most three non-zero ("NZ") values with the other locations being occupied by zeros ("Z"). H-matrix 601 is "constrained" as the non-zero locations, while being limited to three per column, additionally are limited to occurring such that at most there is one non-zero location within each column passing through the three sections 682, 684, 686, or overlap 692 where sections 682, 684 are allowed to overlap or overlap 694 where sections 684, 686 are allowed to overlap. Overlap 692 allows a non-zero element within row 640 to be processed as part of either section 682 or section 684. Similarly, overlap 694 allows a non-zero element within row 650 to be processed as part of either section 684 or section 686. Said another way, overlap 692 allows a non-zero element within row 640 to be processed by either a min1/min2 comparator circuit associated with section 682 or a min1/min2 comparator circuit associated with section 684; and overlap 694 allows a non-zero element within row 650 to be processed by either the min1/min2 comparator circuit associated with section 684 or a min1/min2 comparator circuit associated with section 686.

Of note, both H-matrix 600 and H-matrix 601 support the same code rate. While both H-matrix 600 and H-matrix 601 support the same code rate, overlap 692 and overlap 694 of H-matrix 601 allows for more uniform row weight distribution with compared with that available using H-matrix 600. At the same time, H-matrix 600 is more easily implemented due to the low routing complexity compared with H-matrix 601 that involves greater routing complexity.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. It should be noted that the decoding processes that are discussed in some cases rely on storing data temporarily where a sector failure occurs. Where insufficient memory exists, it is possible to implement a re-read scenario to apply the data processing relying on a cross codewords error correction codeword. Therefore, the above description should not be taken as limiting the scope of the invention, which is defined by the appended claims.

What is claimed is:

1. A data processing system, the system comprising:
   a data decoder circuit including a first comparator circuit, a second comparator circuit, a first set of row storage units, a second set of row storage units, a first routing circuit, and a second routing unit;
   wherein the first set of row storage units includes at least two row storage units;
   wherein the second set of row storage units includes at least two row storage units; and
   wherein the first routing circuit is operable to route any one of the outputs of only the first set of row storage units to the first comparator circuit; and
   wherein the second routing circuit is operable to route any one of the outputs of only the second set of row storage units to the second comparator circuit.

2. The data processing system of claim 1, wherein the data decoder circuit further comprises:
   a third routing circuit operable to route an output of the first comparator circuit to only a subset of the first set of row storage units; and a fourth routing circuit operable to route an output of the second comparator circuit to only a subset of the second set of row storage units.

3. The data processing system of claim 1, wherein the data decoder circuit implements a low density parity check decoding algorithm.

4. The data processing system of claim 1, wherein the data decoding circuit complies with a constrained H-matrix having at least a first section and a second section, wherein the first section is processed by the first comparator circuit, and wherein the second section is processed by the second comparator circuit.

5. The data processing system of claim 4, wherein at most one non-zero location is allowed per each column of the H-matrix in the first section, and at most one non-zero location is allowed per each column of the H-matrix in the second section.

6. The data processing system of claim 5, wherein the H-matrix includes an overlap where at least one and less than all of the row storage units of the at least three row storage units in the first set of row storage units is also included in the second set of row storage units.

7. The data processing system of claim 6, wherein the overlap allows for increased row weight distribution in the H-matrix.

8. The data processing system of claim 1, wherein none of the at least three row storage units in the first set of row storage units is included in the second set of row storage units.

9. The data processing system of claim 1, wherein the first comparator circuit is operable to compare an output of one of the first set of row storage units routed by the first routing circuit with a received variable node to check node message; and wherein the second comparator circuit is operable to compare an output of one of the second set of row storage units routed by the second routing circuit with the received variable node to check node message.

10. The data processing system of claim 1, wherein the system is implemented as part of an integrated circuit.

11. The data processing system of claim 1, wherein the system is implemented as part of a storage device, and wherein the storage device comprises:
a storage medium; and
a read/write head assembly disposed in relation to the storage medium, wherein data processed by the data decoder circuit is derived by sensing information stored on the storage medium using the read/write head assembly.

12. A method for data decoding, the method comprising:
receiving an encoded data set, wherein the encoded data set conforms to a constrained H-matrix;
providing a data decoder circuit including a first comparator circuit, a second comparator circuit, a first set of row storage units, a second set of row storage units, a first routing circuit, and a second routing unit, wherein the first set of row storage units includes at least three row storage units, wherein the second set of row storage units includes at least three row storage units, wherein the first routing circuit is operable to route any one of the outputs of only the first set of row storage units to the first comparator circuit, and
wherein the second routing circuit is operable to route any one of the outputs of only the second set of row storage units to the second comparator circuit; and
applying a data decoding algorithm by the data decoder circuit to the encoded data set to yield a decoded output.

13. The method of claim 12, wherein the data decoder circuit further comprises:
a third routing circuit operable to route an output of the first comparator circuit to only a subset of the first set of row storage units; and
a fourth routing circuit operable to route an output of the second comparator circuit to only a subset of the second set of row storage units.

14. The method of claim 13, wherein the constrained H-matrix has at least a first section and a second section, wherein the first section is processed by the first comparator circuit, and wherein the second section is processed by the second comparator circuit.

15. The method of claim 14, wherein at most one non-zero location is allowed per each column of the H-matrix in the first section, and at most one non-zero location is allowed per each column of the H-matrix in the second section.

16. The method of claim 15, wherein the H-matrix includes an overlap where at least one and less than all of the row storage units of the at least three row storage units in the first set of row storage units is also included in the second set of row storage units.

17. The method of claim 16, wherein the overlap allows for increased row weight distribution in the H-matrix.

18. The method of claim 13, wherein none of the at least three row storage units in the first set of row storage units is included in the second set of row storage units.

19. The method of claim 13, wherein the first comparator circuit is operable to compare an output of one of the first set of row storage units routed by the first routing circuit with a received variable node to check node message; and wherein the second comparator circuit is operable to compare an output of one of the second set of row storage units routed by the second routing circuit with the received variable node to check node message.

20. A data storage device, the storage device comprising:
a storage medium operable to store an encoded data set that conforms to a constrained H-matrix;
a read/write head assembly disposed in relation to the storage medium and operable to sense the encoded data set as a data input;
a data decoder circuit operable to apply a data decoding algorithm to a decoder input derived from the data input, wherein the data decoder circuit includes: a first comparator circuit, a second comparator circuit, a first set of row storage units, a second set of row storage units, a first routing circuit, and a second routing unit;
wherein the first set of row storage units includes at least three row storage units;
wherein the second set of row storage units includes at least three row storage units;
wherein the first routing circuit is operable to route any one of the outputs of only the first set of row storage units to the first comparator circuit; and
wherein the second routing circuit is operable to route any one of the outputs of only the second set of row storage units to the second comparator circuit.

* * * * *